United States Patent
Hermann et al.

(10) Patent No.: US 8,659,270 B2
(45) Date of Patent: Feb. 25, 2014

(54) BATTERY PACK OVERCHARGE PROTECTION SYSTEM

(75) Inventors: Weston Arthur Hermann, Palo Alto, CA (US); Scott Ira Kohn, Redwood City, CA (US); Philip David Cole, Menlo Park, CA (US); Nicholas Robert Kalayjian, San Carlos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 518 days.

(21) Appl. No.: 12/916,050

(22) Filed: Oct. 29, 2010

(65) Prior Publication Data

US 2012/0105015 A1    May 3, 2012

(51) Int. Cl.
*H02J 7/24* (2006.01)
*H02J 7/06* (2006.01)
*H02J 7/04* (2006.01)
*H02J 7/16* (2006.01)
*H02H 3/00* (2006.01)
*H02H 3/20* (2006.01)

(52) U.S. Cl.
USPC ............. 320/164; 320/162; 320/163; 361/86; 361/91.1; 361/91.5

(58) Field of Classification Search
USPC ............ 320/118, 134, 162, 164, 163; 363/50, 363/56.03–56.12; 361/86, 91.1, 91.5
See application file for complete search history.

(56) References Cited

U.S. PATENT DOCUMENTS

| | | | | |
|---|---|---|---|---|
| 3,743,887 A * | 7/1973 | Keough et al. | | 361/86 |
| 3,938,021 A * | 2/1976 | Kosmin | | 320/148 |
| 4,449,080 A * | 5/1984 | Konrad et al. | | 318/139 |
| RE34,159 E * | 1/1993 | Harrington et al. | | 361/31 |
| 5,369,540 A * | 11/1994 | Konrad et al. | | 361/6 |
| 5,963,019 A * | 10/1999 | Cheon | | 320/150 |
| 6,046,575 A * | 4/2000 | Demuro | | 320/134 |
| 6,172,482 B1 * | 1/2001 | Eguchi | | 320/134 |
| 6,538,345 B1 * | 3/2003 | Maller | | 307/86 |
| 6,713,708 B2 * | 3/2004 | Hedberg | | 219/98 |
| 6,992,463 B2 * | 1/2006 | Yoshio | | 320/134 |
| 7,495,879 B2 * | 2/2009 | Thexton et al. | | 361/144 |
| 2005/0077878 A1 * | 4/2005 | Carrier et al. | | 320/134 |
| 2006/0139006 A1 * | 6/2006 | Wang et al. | | 320/134 |
| 2010/0013085 A1 * | 1/2010 | Oi et al. | | 257/693 |
| 2010/0123434 A1 * | 5/2010 | Iwata | | 320/118 |

\* cited by examiner

*Primary Examiner* — Richard V Muralidar
*Assistant Examiner* — Steve T Chung
(74) *Attorney, Agent, or Firm* — J. Richard Soderberg (57) ABSTRACT

An overcharge protection device (OPD) is provided that may be used alone, or in combination with conventional charging protection systems, to protect a battery pack from the occurrence of a potentially damaging overcharging event. The OPD is designed to be coupled to, and interposed between, the terminals of the battery pack. During normal system operation, the OPD has no effect on the operation of the charging system or the battery pack. During an overcharging event, if overcharging is not prevented by another conventional system, the OPD of the invention creates a short across the terminals of the battery pack causing a battery pack fuse designed to provide battery pack short circuit protection to blow, thereby interrupting the current path from the charger to the battery pack and preventing the battery pack from being overcharged.

28 Claims, 6 Drawing Sheets

BATTERY PACK OVERCHARGE PROTECTION SYSTEM

FIELD OF THE INVENTION

The present invention relates generally to battery packs and charging systems and, more particularly, to a system for protecting a battery pack from overcharging.

BACKGROUND OF THE INVENTION

Battery overcharging is one of the most destructive events that can occur in the life of a battery, an event that leads to undesirable reactions occurring within the battery and the generation of excessive heat. If these reactions go unchecked, the increase in heat generation quickly reaches the point at which more heat is being generated than can be withdrawn, leading to the condition commonly referred to as thermal runaway. At this point, the amount of heat being generated is great enough to lead to the combustion of the battery as well as materials in proximity to the battery.

To reduce the risk of thermal runaway, most rechargeable cells include one or more built-in safety mechanisms that are designed to automatically take effect during an abusive situation (e.g., overcharging, internal short circuit, physical abuse, manufacturing defects, etc.). For example, a conventional cell will often include an internal positive temperature coefficient (PTC) current limiting device, a current interrupt device (CID), and a venting mechanism, the venting mechanism designed to rupture at high pressures and provide a pathway for cell contents to escape. The PTC element is designed to exhibit a very high impedance when the current density exceeds a predetermined level while the CID is designed to break the electrical connection between the electrode assembly and the cell terminal if the pressure within the cell exceeds a predetermined level.

While individual cells may include one or more built-in safety mechanisms, as noted above, these safety mechanisms are not always effective when the cell is one of a large group of cells. For example, the CID within a cell typically has a relatively low voltage rating and, as a result, may be subject to arcing and fire when it attempts to open in a high voltage battery pack. Accordingly, many conventional rechargeable battery packs may include one or more overcharge protection systems at the system level, each of which is designed to prevent the battery or batteries within a battery pack from being overcharged. These systems can be divided into those associated with the battery pack itself, and those associated with the charger/charging circuit. On the battery side, usually one or more voltage sensing circuits are used to monitor the condition of the batteries, either individually or as a group of cells. When these circuits sense overcharging, they disrupt the connection between the battery pack and the charging system, typically by opening the contactor or pair of contactors that couple the battery terminals to the charging circuit. The use of a pair of contactors, one coupled to either terminal, versus a single contactor, provides an additional level of protection. On the charger side, sensing circuits are used to monitor the load, i.e., the battery pack, coupled to the charging circuit. When the charging system determines that overcharging is occurring, or about to occur, the charging system is designed to terminate charging.

While one or more levels of overcharge protection are included in most systems utilizing rechargeable batteries, there is still a risk of an overcharging event occurring, for example due to the failure of both a charging circuit and a contactor. If such a failure were to occur in a system utilizing a large battery pack, overcharging could lead to all of the cells within the pack undergoing nearly simultaneous thermal runaway. While the collateral damage of such an event could be huge, if it were to occur in a safety sensitive application such as an electric vehicle, the consequences could be catastrophic. Accordingly, although the prior art discloses various systems that provide protection from an overcharging event, an additional layer of protection that is independent of the contactors and the charging circuit is desirable. The present invention provides such an additional layer of protection.

SUMMARY OF THE INVENTION

The present invention provides an overcharge protection device (OPD) that may be used alone, or in combination with conventional charging protection systems, to protect a battery pack from the occurrence of a potentially damaging overcharging event. The OPD is designed to be coupled to, and interposed between, the terminals of the battery pack. During normal system operation, it has no effect on the operation of the charging system or the battery pack. During an overcharging event, if overcharging is not prevented by another conventional system, the OPD of the invention creates a short across the terminals of the battery pack causing a battery pack fuse designed to provide battery pack short circuit protection to blow, thereby interrupting the current path from the charger to the battery pack and preventing the battery pack from being overcharged.

In at least one embodiment of the invention, a method of protecting a battery pack from overcharging during a battery pack charging cycle is provided. The method includes the steps of electrically connecting a first lead of an overcharge protection device (OPD) to a first output terminal of the battery pack; connecting a second lead of the OPD to a second output terminal of the battery pack; and monitoring the charger output voltage, wherein if the voltage exceeds a predetermined trigger voltage the OPD performs the step of creating a short between the first and second output terminals of the battery pack, causing a fuse corresponding to the battery pack to blow. The OPD may be connected to the battery pack output terminals on either side of the terminal contactors. The method may further comprise the step(s) of (i) selecting a solid state device such as an IGBT for the OPD, where the threshold voltage corresponds to the predetermined trigger voltage; (ii) selecting a crowbar circuit for the OPD, where the trip voltage for the crowbar circuit corresponds to the predetermined trigger voltage; or (iii) selecting a solenoid relay switch for the OPD, where the threshold voltage for the relay switch corresponds to the predetermined trigger voltage.

In at least one other embodiment of the invention, a system that provides overcharge protection for a battery pack during charging is provided, the system comprised of an overcharge protection device (OPD) that is electrically coupled to, and interposed between, the first and second output terminals of the battery pack. During charging, if the voltage corresponding to the charging power exceeds a predetermined OPD trigger voltage, the OPD creates a short across the battery output terminals, the short having a large enough $I^2t$ value to cause a battery pack fuse to blow. The OPD may be connected to the battery pack output terminals on either side of the terminal contactors. The system may include an RC circuit electrically interposed between the OPD and one battery output terminal. Preferably the OPD does not include a processor and does not include a secondary power source separate from the battery pack. The OPD may be comprised, for example, of an IGBT, a crowbar circuit, a solenoid relay switch, or other means.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all-electric vehicle, also referred to as an EV, plug-in hybrid vehicles, also referred to as a PHEV, or a hybrid vehicle (HEV), a hybrid vehicle utilizing multiple propulsion sources one of which is an electric drive system. The terms "overcharge protection device" and "OPD" may be used interchangeably. It should be understood that identical element symbols used on multiple figures refer to the same component, or components of equal functionality. Additionally, the accompanying figures are only meant to illustrate, not limit, the scope of the invention and should not be considered to be to scale.

Figure 1:
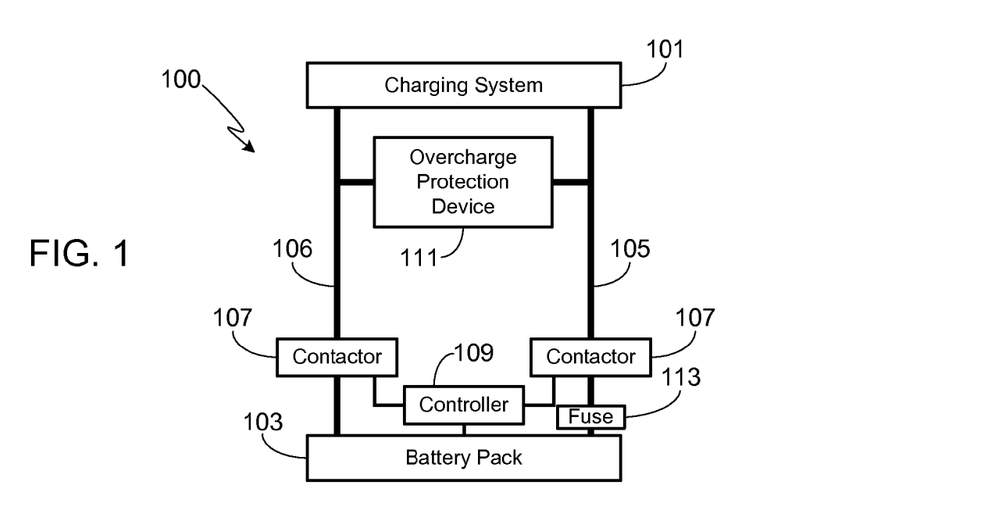
FIG. 1 provides a simplified block diagram illustrating the present invention.

FIG. 1 provides a simplified block diagram illustrating the present invention. As shown, a charging system 101 is coupled to a battery pack 103 via leads 105/106. Charging system 101 may be permanently integrated within system 100, the regenerative braking system used on some EVs being an example of such an on-board charging system. Alternately, charging system 101 may be a separate, independent system such as the home and work charging stations used by EV owners to charge their vehicles. Regardless of whether the charging system is integral to or separate from system 100, at least one, and preferably two, terminal contactors 107 (also referred to herein as simply contactors) are used to couple and decouple the charging system from the battery pack. In the case of a charging system 101 that is separate from system 100, contactors 107 may be integral to the coupling system used to couple (i.e., plug-in) battery pack 103 to charging system 101. In most integrated systems, however, contactors 107 are separate from the charging system plug.

In the simplest case, contactor or contactors 107 are controlled by a switch that allows the user to couple/decouple the charging system 101 to the battery 103 when desired. In most applications, however, contactors 107 are regulated by a control subsystem 109. Controller 109 is often coupled to one or more sensors (not shown) that monitor the condition (e.g., SOC, temperature, etc.) of the batteries within battery pack 103 and decouple, via contactor(s) 107, the charging system from the batteries before overcharging or other cell damage may occur. Typically controller 109 and contactor(s) 107 are under the control of the overall system or the battery pack control subsystem, thus providing greater flexibility with respect to the various charging systems that may be used to charge the battery pack. In addition, as the overcharging protection circuitry integrated within the charging system can easily power down, or utilize a dummy load, if it appears that overcharging may occur, it is typically unnecessary to provide the charging system with direct control over the contactor(s) via controller 109.

Contactors 107 are typically comprised of mechanical relay switches, thus allowing them to handle the current levels associated with most large battery packs. In some applications, however, such as those employing low current levels, solid state contactor assemblies may be used. Although not required, the use of a pair of contactors, as shown, is preferred in order to provide system redundancy.

In accordance with the present invention, in addition to the other overcharging protection mechanisms in place in a conventional charging system, an additional overcharge protection device (OPD) 111 is included in system 100. In order to provide overcharging protection that is less vulnerable to traditional system failures, OPD 111 does not utilize a microprocessor or other controller-based system, thereby eliminating the risk of a software/firmware failure leading to the inoperability of the protection device. Similarly, OPD 111 does not utilize a secondary power source, e.g., a secondary battery, thus avoiding device failure due to a dead power source. Lastly, OPD 111 is not in line with any high voltage lines such as the high voltage leads 105/106 that are used to couple charger 101 to battery pack 103. As a result, OPD 111 is less susceptible to failure due to high current spikes.

OPD 111 is designed to be coupled to, and interposed between, the terminals of battery pack 103. During normal system operation, it has no effect on the operation of charging system 101 or battery pack 103. Nor does it interfere with the normal operation of any of the conventional overcharging systems that may be in use in the system, overcharging systems such as those described above. During an overcharging event, if overcharging is not prevented by one of the other systems, OPD 111 creates a short across the terminals of the battery pack. Assuming that the short created by OPD 111 is of sufficient $I^2t$, a fast-acting, high voltage fuse 113 is blown, thereby interrupting the current path to battery pack 103 and preventing it from being overcharged by charging system 101. Preferably fuse 113 is a fuse already in place and designed to provide short circuit protection to battery pack 103. While fuse 113 is shown separate from battery pack 103, it should be understood that in most applications fuse 113 is integrated within battery pack 103. As battery pack short circuit protection fuses are well known by those of skill in the art, further description is not provided herein.

While FIG. 1 provides the basic integration of OPD 111 into a system in order to protect a battery pack from overcharging, it will be appreciated that there are other, equally applicable, configurations that may be used to integrate OPD 111 into a rechargeable battery system. Some of the preferred configurations are shown in FIGS. 2-6. As FIGS. 1-6 are only intended to illustrate various OPD integration configurations, these figures do not include the conventional overcharging protection systems that may, or may not, be in use. As previously noted, a conventional system will typically include one or more of these systems, e.g., systems integrated within the charger, systems that monitor battery pack conditions and control the battery pack contactors, and systems that may be integrated within the individual batteries comprising the battery pack. OPD 111 may be used alone, or in combination with any or all of these conventional overcharging protection systems. Preferably, and as previously noted, a system includes all of these overcharging protection systems and OPD 111 simply provides one more level of protection. Additionally, while FIGS. 1-6 show a pair of contactors coupling the battery pack to each charging system as well as each battery pack application (e.g., drive inverter for an EV), OPD 111 does not require the use of contactor pairs. As previously noted, during an overcharging event OPD 111 does not rely on the contactors, rather it shorts the battery pack.

Figure 2:
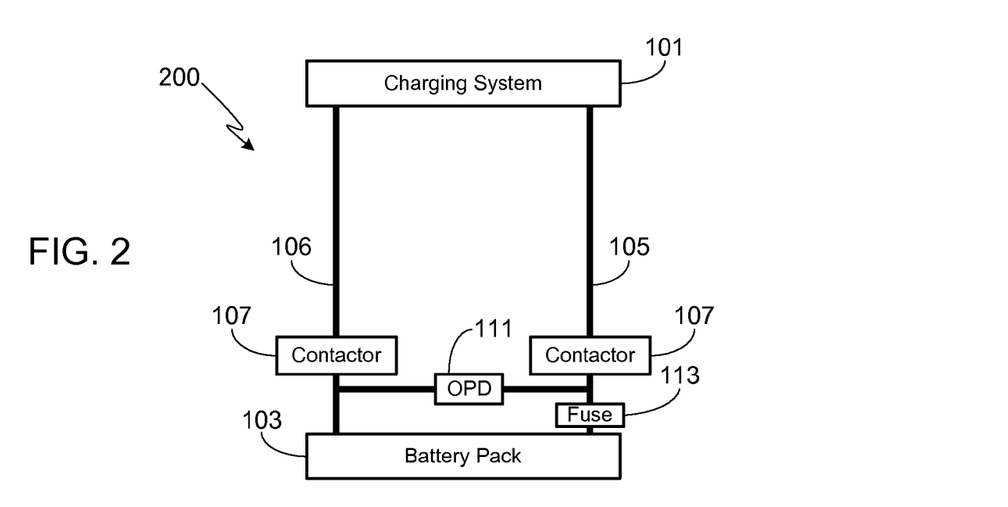
FIG. 2 provides an alternate system configuration.

FIG. 2 illustrates a minor variation of system 100. As shown, in system 200 OPD 111 is connected across the battery pack terminals on the battery side of contactors 107. Preferably, however, the OPD is connected to the leads on the charging system's side of the contactors (e.g., as shown in FIG. 1), thus isolating the OPD from the battery pack and other system components except when the charging system is coupled to the battery pack. Such isolation is preferred as it limits any additional load, and thus drain, placed on the battery pack by the OPD as well as further reducing the risk of the occurrence of false events (e.g., the OPD shorting the battery pack under non-overcharging conditions).

Figure 3:
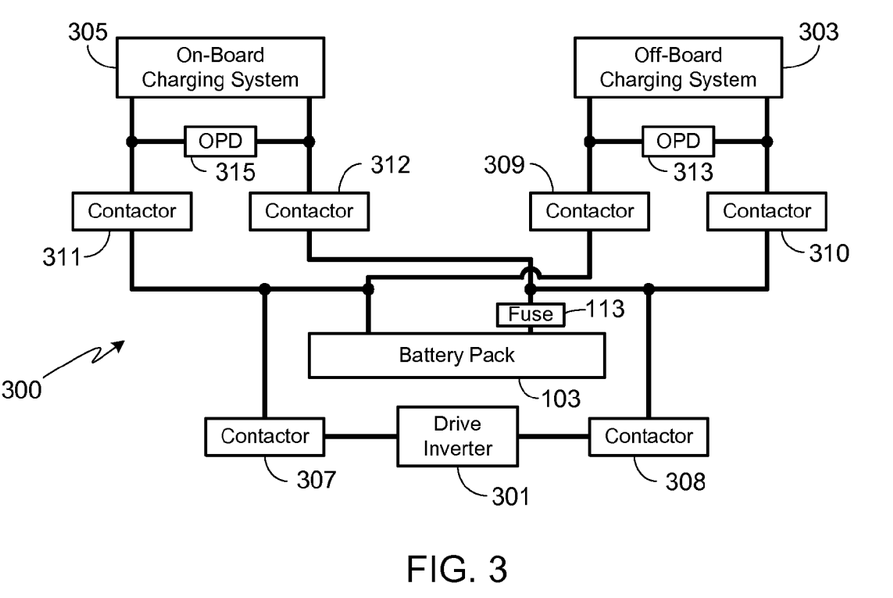
FIG. 3 provides an alternate system configuration.

FIG. 3 illustrates a configuration for integrating an OPD into a system 300 that includes a drive inverter 301. Drive inverter 301 is used to convert the output of battery pack 103 to a form compatible with one or more electrical systems that are coupled to system 300. For example, in a preferred embodiment, system 300 is associated with an electric vehicle (EV) and drive inverter 301 is coupled to an electric motor (not shown) that provides propulsion power to the EV. It will be appreciated that the invention may be used with battery systems utilized by other systems, and that the use of an inverter is simply to illustrate the integration of OPD 111 into a preferred system application.

As the system application illustrated in FIG. 3 is an EV, system 300 includes a pair of charging systems 303 and 305 as is common. Charging system 303 is an off-board charging system that is external to the vehicle. Accordingly, charger 303 represents a home-based charger, a work-based charger, or other charging system available to charge battery pack 103. As such, charger 303 is coupled to battery pack 103 via a removable plug. Charging system 305 is an on-board charging system that is internal to the vehicle. For example, charger 305 may be a regenerative braking system charger, a solar panel(s) mounted to the vehicle, or other on-board charging system.

In system 300, each subsystem that is coupled to battery pack 103 is coupled via a pair of contactors. Specifically, inverter 301 is coupled to battery pack 103 via contactors 307/308; off-board charging system 303 is coupled to battery pack 103 via contactors 309/310; and on-board charging system 305 is coupled to battery pack 103 via contactors 311/312. As previously noted, although the redundancy provided by dual contactors is preferred, a single contactor can be used in each instance to make/break the electrical connection between the subsystem in question (e.g., inverter 301, off-board charging system 303 and on-board charging system 305) and the battery pack. Also as previously noted, fuse 113 represents the fast-blow, high voltage fuse (or fuses) that protect a conventional battery pack from shorts and it will appreciated that one or more fuses may be used, and the fuses may be internal to the battery pack, or external to the battery pack as shown.

Figure 4:
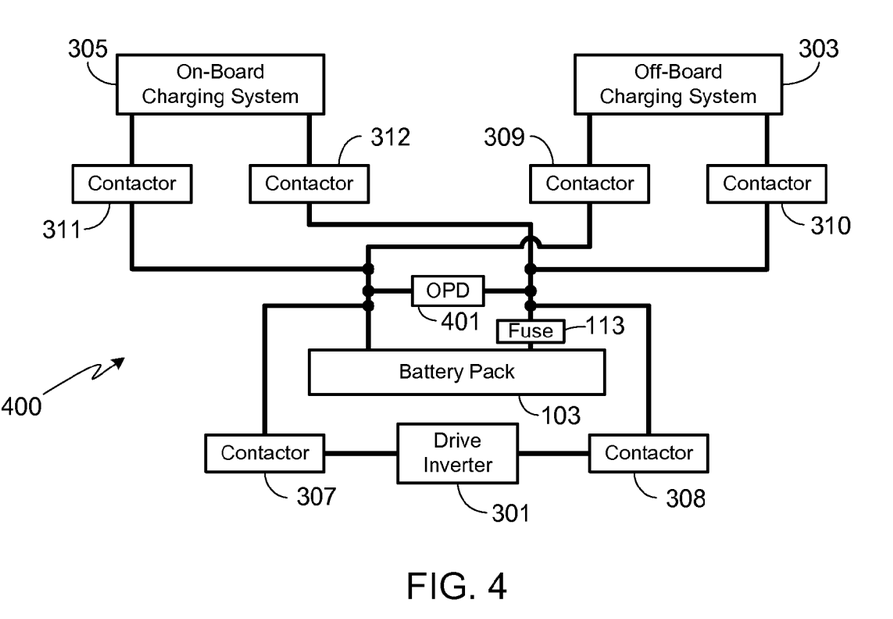
FIG. 4 provides an alternate system configuration.

As shown in FIG. 3, interposed between the leads coupling each charging system to the battery pack is an OPD. Specifically, OPD 313 is connected to, and interposed between, the leads coupling off-board charging system 303 to battery pack 103. Similarly, OPD 315 is connected to, and interposed between, the leads coupling on-board charging system 305 to battery pack 103. As previously noted, while not preferred, OPD 313 may be connected to the leads on the other side of contactors 309/310, and OPD 315 may be connected to the leads on the other side of contactors 311/312. It will be appreciated that by locating the OPD on the battery side of the contactors, a single OPD can be used for both the on-board and off-board charging systems. Such an implementation is shown in FIG. 4, which shows an OPD 401 located on the battery side of the charging system contactors.

Figure 5:
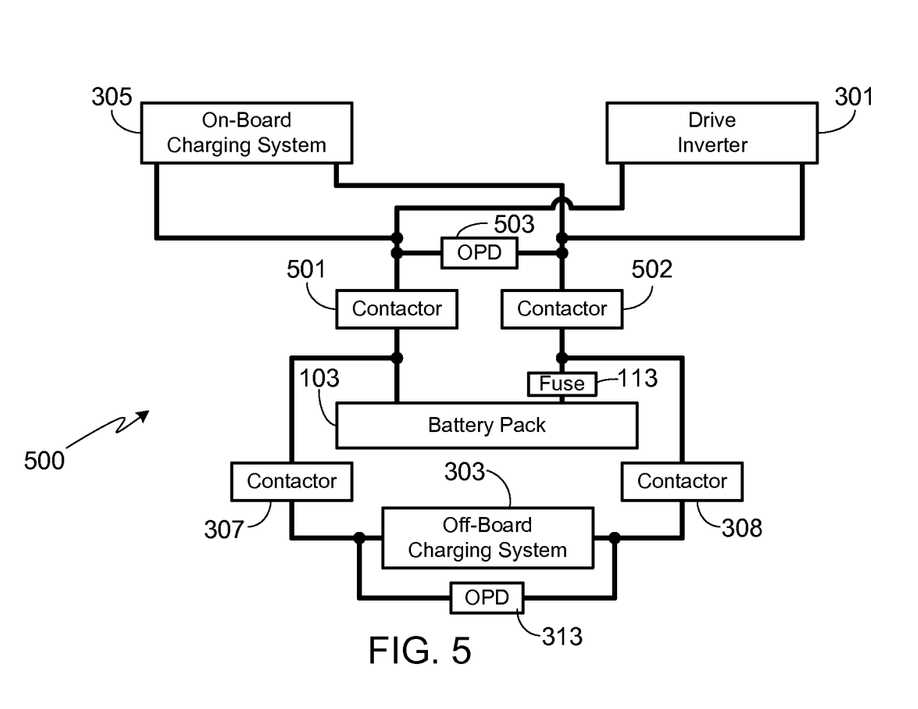
FIG. 5 provides an alternate system configuration.

In system 500, shown in FIG. 5, on-board charging system 305 and drive inverter 301 share a pair of contactors 501/502. OPD 503 is preferably located on the application side, i.e., the non-battery side, of contactors 501/502. As in system 300, OPD 313 is preferably located between off-board charging system 303 and corresponding contactors 309/310.

Figure 6:
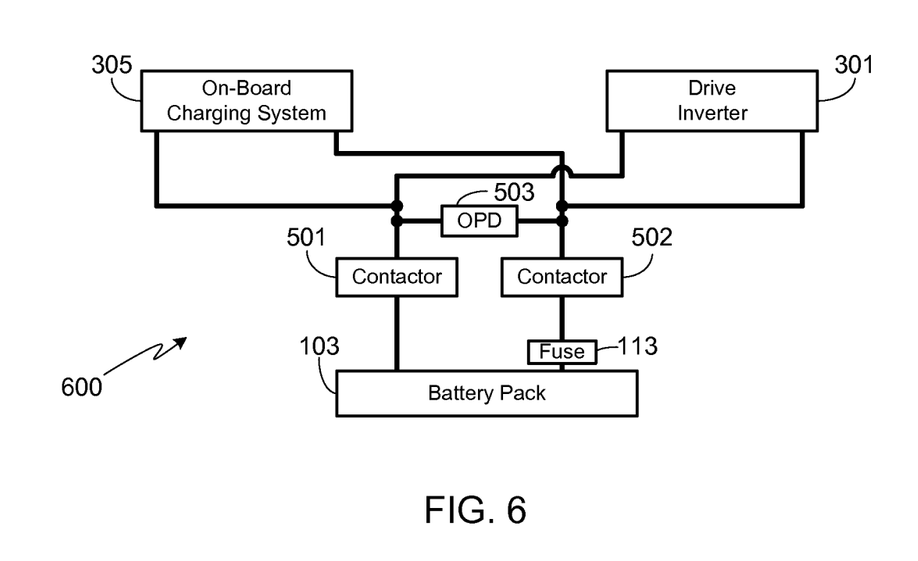
FIG. 6 provides an alternate system configuration.

System 600, shown in FIG. 6, is the same as system 500 except for the elimination of the off-board charging system and related contactors and OPD. It is envisioned that a system such as system 600 would be used with a hybrid vehicle that does not allow the battery pack to be charged via an external charging system. In such a vehicle, all charging is via on-board charging system 305.

Overcharge Protection Device (OPD)

Regardless of the manner in which the OPD of the invention is implemented within a vehicle, for example as illustrated in FIGS. 1-6, the purpose of the OPD is the same: to interrupt the charging current in response to a voltage that is higher than the maximum allowed charging voltage, this interruption occurring before the cell or cells within the battery pack can drastically overheat. Although it may be used alone, preferably the OPD of the invention is used in combination with other, conventional, overcharge protection systems, thereby providing another level of protection, rather than a substitute system. Additionally and as previously noted, the OPD of the invention is less susceptible to failure than a conventional system as it does not utilize a microprocessor or other controller, does not utilize a secondary power source, and is not located directly within a high voltage line.

The presently disclosed OPD is designed to short the battery during an overcharging event, thus blowing the fast, high voltage fuse typically integrated into the battery pack. While the present invention assumes that the system, and preferably the battery pack itself, includes such a fuse, it will be appreciated that if a fuse is not included, it is simply added to the system. Fuse 113 shown in FIGS. 1-6 is representative of such a fuse. As the design and implementation of battery pack fuses are well known by those of skill in the art, further discussion is not provided herein.

Included herein are several designs for an OPD in accordance with the invention. It will be appreciated that the specifics for each design depend upon the characteristics of the system and the battery pack to which it is to be coupled. In particular, the voltage at which the OPD creates a battery short depends upon the desired charging voltage of the battery pack and charging system, and more importantly, the maximum voltage that is to be allowed before the OPD shorts the battery pack. In general, the voltage selected for activation of the OPD is set high enough to allow any conventional systems, either on-board or integrated into the charger, to be triggered by the overcharging event. Setting the maximum voltage in this manner is preferred since the OPD of the invention is designed to operate only once before needing to be replaced, while most conventional overcharging protection systems are designed to reset after the overcharging event has passed. At the same time, however, the maximum allowed voltage for the OPD must be set low enough to insure that the battery or batteries within the battery pack do not reach a dangerous level of self-heating that would potentially lead to the initiation of thermal runaway.

As previously noted, the OPD of the invention creates a short across the leads of the battery pack when the voltage supplied by a charging system exceeds a preset level, thereby causing the fast-blow, high voltage fuse associated with the battery pack to interrupt the flow of power to the battery pack. The disclosed OPD is designed to operate only once, i.e., it is not resettable, and therefore once it is activated it must be replaced, along with the battery pack fuse(s). As the intent of the OPD is to short out the battery pack, causing the pack's fuse to blow, the OPD must conduct current long enough to provide the necessary energy (i.e., the $I^2t$) to insure that the fuse blows. Additionally, the $I^2$ rating of the OPD must be high enough to insure that the fuse blows throughout the expected operational range of the battery pack, i.e., from the maximum battery impedance to the minimum battery impedance.

It will be appreciated that there are many types of devices that may be coupled to, and interposed between, the terminals of a battery that will perform the functions of an OPD as described above. In general, and as previously described, an OPD in accordance with the invention (i) must have minimal, or no, effect on the normal operation of the battery and the charging system; (ii) will create a short across the terminals of the battery when the charging voltage exceeds a preset threshold value; and (iii) will provide a low impedance electrical connection between the battery terminals once the preset threshold voltage is exceeded, the low impedance connection conducting current long enough to provide the required $I^2t$ value to blow the battery pack fuse. In addition, preferably the OPD has a high enough threshold voltage to allow any conventional overcharge protection systems to be triggered, thereby avoiding the need to trigger the OPD of the invention in order to protect the battery pack. Additionally, in a preferred embodiment of the invention, the OPD (i) is not microprocessor controlled; (ii) does not utilize a controller; (iii) does not include its own power source; and (iv) is not in-line with a high voltage line.

Figure 7:
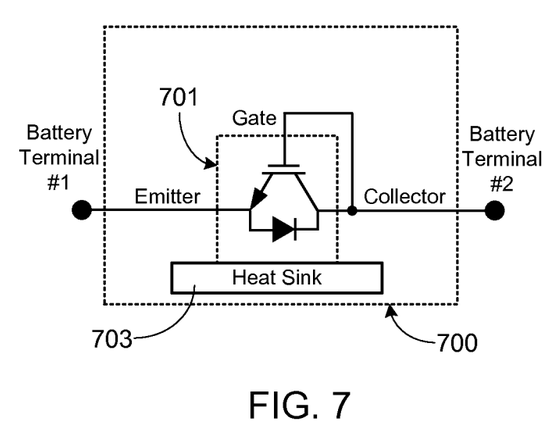
FIG. 7 illustrates a configuration of an overcharge protection device in accordance with one embodiment of the invention.

While there are a variety of devices that may be used for the OPD of the invention, and used within a system as described above relative to systems 100-600 (e.g., for OPD 111, OPD 313, OPD 315, OPD 401, or OPD 503), several preferred embodiments are shown and described below. FIG. 7 illustrates one preferred embodiment of an OPD 700 consisting of a doped silicon junction device 701 that breaks down and conducts current at the predetermined voltage. The invention is not limited to a specific device 701, rather any semiconductor device or devices with a sufficiently large $I^2t$ value to short out the battery pack fuse, when tripped, may be used. For example, in illustrated OPD 700 device 701 is comprised of an IGBT (insulated gate bipolar transistor) although other devices that provide similar functionality may also be used (e.g., the combination of a power MOSFET and a bipolar power transistor). Note that in FIG. 7, as well as in FIGS. 8-12, the OPD is shown connected to "battery terminal #1" and "battery terminal #2". It will be appreciated that these connections refer to placing the OPD across the battery output terminals as previously described, regardless of where in the circuit the OPD is positioned.

In OPD 700, the emitter and the collector of IGBT 701 are connected to battery terminals 1 and 2 as shown. The gate is tied to the collector and the device is selected such that the threshold voltage is at an appropriate level given the characteristics of the battery pack. For example, assuming a battery pack with 100 cells in series with each cell having a voltage maximum of 4.2 volts, an appropriate threshold voltage for device 701 would be 445 volts+/−15 volts. Below the threshold voltage, only a small leakage current will flow through the device. Once the voltage at the gate reaches or exceeds the threshold, or breakdown, voltage, current passes through the device, thereby shorting the battery pack to which the device is connected. This, in turn, blows the battery pack fuse and disrupts the flow of current into the pack, thereby preventing thermal runaway.

As previously noted, the $I^2t$ value for device 701 must be larger than that of the battery pack fuse by a sufficient amount to insure that the current will flow through the OPD long enough to provide the necessary energy to blow the fuse. If the $I^2t$ value of device 701 is too low, it can been increased by simply thermally coupling the device to an appropriately sized heat sink 703, as shown, or by increasing the size and current rating of the device.

Figure 8:
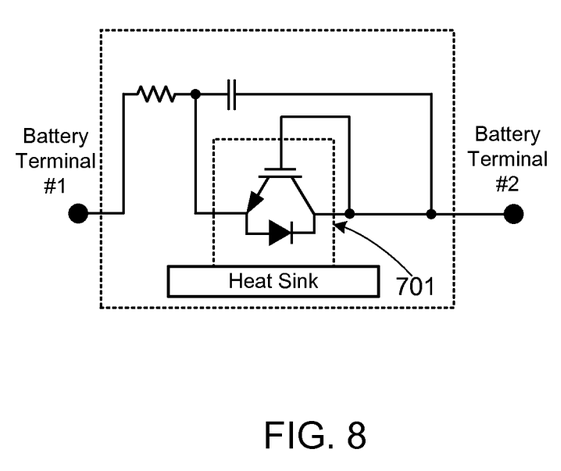
FIG. 8 illustrates a modification of the overcharge protection device shown in FIG. 7, the modification including an RC circuit to limit the risk of a false trigger.

Since overcharging is a process that occurs over a period of time of several minutes, preferably a simple low-pass RC circuit is connected in series with device 701, as illustrated in FIG. 8, thus eliminating the risk of voltage noise on the bus exceeding the threshold voltage and activating device 701.

Figure 9:
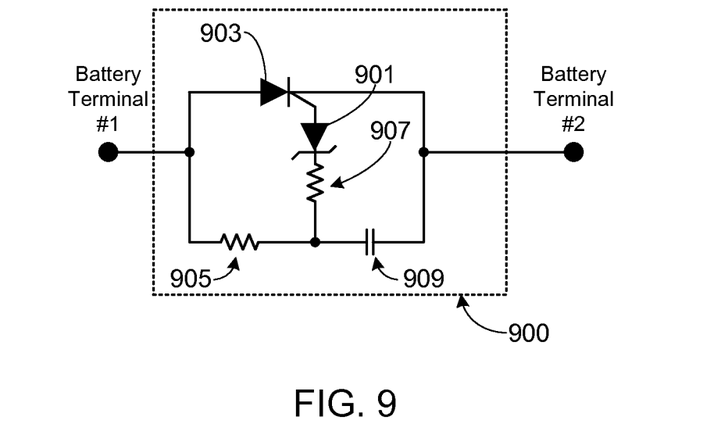
FIG. 9 illustrates an alternate configuration of an overcharge protection device in accordance with another embodiment.

As noted above, the OPD of the invention is not limited to the use of an IGBT. Other devices that meet the afore-described characteristics may also be used. For example, FIG. 9 shows an OPD 900 that utilizes a crowbar circuit to short out the battery pack when the voltage increases to a dangerous level. As shown, the crowbar circuit interposed between the battery terminals consists of a zener diode 901, a silicon controlled rectifier (SCR) 903, a pair of resistors 905/907 and a capacitor 909, all rated to handle the desired trip voltage for the intended battery pack. Note that thyristor 903 may be replaced with a trisil or thyratron. The zener diode voltage is that of the trip voltage and therefore for a 100 series cell pack, each cell having a 4.2 volt maximum rating, the trip (i.e., trigger) voltage would be set at approximately 445 volts+/−15 volts. When zener diode 901 reaches the trip voltage, current flows through the diode and triggers SCR 903, thereby shorting the battery and blowing the battery pack fuse. As in the embodiment shown in FIG. 8, the RC circuit is included to prevent noise or spikes from accidentally triggering the OPD. Also as in the prior embodiment, a heat sink (not shown) may be used to tune the $I^2t$ value of the device.

Figure 10:
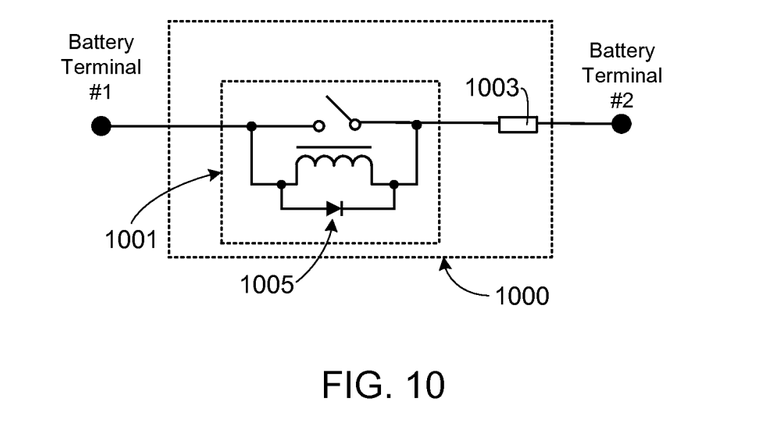
FIG. 10 illustrates an alternate configuration of an overcharge protection device in accordance with yet another embodiment.

In addition to the use of a circuit, in particular a semiconductor-based circuit, for the OPD of the invention, an electro-mechanical device may also be used. For example, FIG. 10 shows an OPD 1000 that includes a solenoid relay switch 1001. When the voltage exceeds the threshold (i.e., trigger) voltage, the solenoid is activated, thereby closing the relay and shorting out the battery pack. In at least one embodiment of OPD 1000, the windings of the solenoid are comprised of a temperature-neutral material such as Manganin® or similar. Depending upon the design of the system for which OPD 1000 is to used (i.e., the voltage of the battery pack and the trigger voltage, the characteristics of the battery pack fuse, etc.), it may be necessary to alter the characteristics of switch 1001, thus insuring that the duration of the short and the inductance provided by the switch are sufficient to insure that the battery pack fuse blows. Accordingly, in some embodiments OPD 1000 may include an inductor 1003 in series with relay 1001, and/or a reverse-connected diode 1005 across the coil of the relay. If these modifications are insufficient for the particular system application in question, relay 1001 may be comprised of a latching relay. Additionally, and as described above relative to other OPD embodiments, an RC circuit (not shown) may be used to minimize the risk of a false trigger due to a voltage spike.

Figure 11:
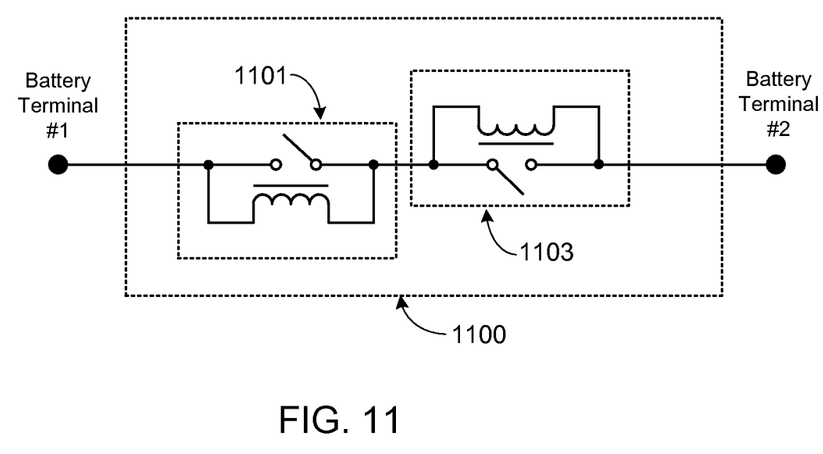
FIG. 11 illustrates a modification of the configuration shown in FIG. 10, the illustrated embodiment using a pair of solenoid relay switches.

It will be appreciated that the design and configuration of the device used in the OPD must take into account the expected operating conditions of the OPD. Accordingly, if the intended application for the OPD of the invention is an electric vehicle, the OPD must be configured to handle the temperature range, vibration levels, and acceleration/deceleration/turning forces associated with a typical vehicle. Therefore for such an application non-mechanical OPDs are preferred, for example an OPD such as those shown in FIGS. 7-9. If an electro-mechanical OPD is to be used, such as OPD 1000, preferably it is modified to decrease the chance of a false event, for example due to the high vibration levels that may result from driving on an excessively bumpy road. One way of modifying the relay switch shown in FIG. 10 is to include two of them, but oriented such that the contactors move in opposite directions. This is schematically illustrated in FIG. 11 in which solenoid relay switch 1101 is oriented in the opposite direction from solenoid relay switch 1103. As a result of this configuration, a force that might create a false trigger in one of the relays is unlikely to create a false trigger in the other relay. As both relays must be triggered to create a short across the battery, the likelihood of a false event is reduced. Note that as opposed to orienting the solenoids in opposite directions, they may be oriented at ninety degrees from one another. If desired, more than two relays may be used. It will be appreciated that an OPD utilizing multiple solenoid relays may also inductor 1003 (not shown in FIG. 11), diode 1005 (not shown in FIG. 11), or RC circuit 1007 (not shown in FIG. 11).

Figure 12:
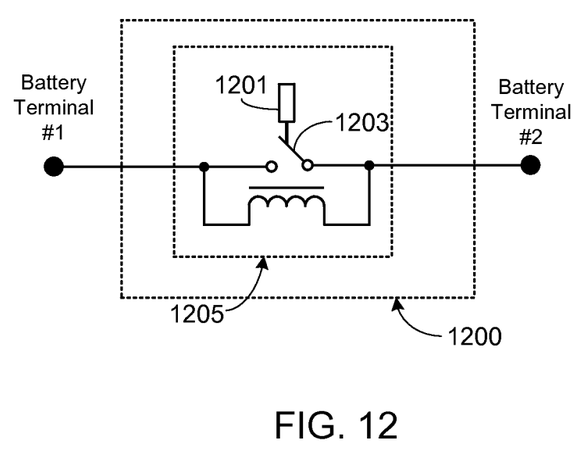
FIG. 12 illustrates a modification of the system shown in FIG. 10.

In addition to increasing the number and varying the orientation of each solenoid, other means may be used to reduce the risk of false triggers in an OPD utilizing a solenoid relay switch. For example, a mechanical damper (e.g., fluid or gas filled damper) may be attached to the contactor of the relay switch, thereby preventing shocks from accidentally triggering the OPD. This modification of system 1000 is shown in FIG. 12 where a damper 1201 is coupled to connector 1203 of solenoid relay 1205.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of protecting a battery pack from overcharging during a battery pack charging cycle, wherein said battery pack is comprised of a plurality of individual batteries, wherein during said battery pack charging cycle a source of charging power is coupled to the battery pack and provides charging power to the battery pack, said method comprising the steps of:
   electrically connecting a first lead of a doped silicon junction device to a first output terminal of said battery pack, wherein said doped silicon junction device is configured to break down and conduct current at a predetermined threshold voltage;
   locating an electrical contactor between a junction of said first lead of said doped silicon junction device and said first output terminal of said battery pack and said source of charging power; and
   electrically connecting a second lead of said doped silicon junction device to a second output terminal of said battery pack, wherein said second output terminal represents an oppositely charged terminal of said battery pack, and wherein when a voltage corresponding to said charging power during said battery pack charging cycle exceeds said predetermined threshold voltage said doped silicon junction device breaks down and creates a short between said first and second output terminals of said battery pack, wherein said short causes a fuse corresponding to said battery pack to blow and interrupt a current path between said battery pack and said source of charging power.

2. The method of claim 1, further comprising the step of locating a second electrical contactor between a junction of said second lead of said doped silicon junction device and said second output terminal of said battery pack and said source of charging power.

3. A method of protecting a battery pack from overcharging during a battery pack charging cycle, wherein said battery pack is comprised of a plurality of individual batteries, wherein during said battery pack charging cycle a source of charging power is coupled to the battery pack and provides charging power to the battery pack, said method comprising the steps of:
   electrically connecting a first lead of a doped silicon junction device to a first output terminal of said battery pack, wherein said doped silicon junction device is configured to break down and conduct current at a predetermined threshold voltage;
   locating an electrical contactor between a junction of said first lead of said doped silicon junction device and said first output terminal of said battery pack and said first output terminal of said battery pack; and
   electrically connecting a second lead of said doped silicon junction device to a second output terminal of said battery pack, wherein said second output terminal represents an oppositely charged terminal of said battery pack, and wherein when a voltage corresponding to said charging power during said battery pack charging cycle exceeds said predetermined threshold voltage said doped silicon junction device breaks down and creates a short between said first and second output terminals of said battery pack, wherein said short causes a fuse corresponding to said battery pack to blow and interrupt a current path between said battery pack and said source of charging power.

4. The method of claim 3, further comprising the step of locating a second electrical contactor between a junction of said second lead of said doped silicon junction device and said second output terminal of said battery pack and said second output terminal of said battery pack.

5. The method of claim 1, further comprising the steps of selecting an insulated gate bipolar transistor (IGBT) for said doped silicon junction device, wherein said IGBT passes current and shorts said battery pack when said voltage exceeds said predetermined threshold voltage.

6. The method of claim 5, further comprising the step of thermally coupling said IGBT to a heat sink to increase the $I^2t$ value of the IGBT.

7. The method of claim 1, further comprising the step of selecting a crowbar circuit with a trip voltage corresponding to said predetermined threshold voltage for said doped silicon junction device, wherein said crowbar circuit passes current and shorts said battery pack when said voltage exceeds said trip voltage.

8. A system that provides overcharge protection for a battery pack during a battery pack charging cycle, wherein during said battery pack charging cycle a source of charging power is coupled to the battery pack and provides charging power to the battery pack, the system comprising a doped silicon junction device electrically connected between a first output terminal and a second output terminal of the battery pack, said battery pack comprised of a plurality of individual batteries, wherein a first lead of said doped silicon junction device is electrically connected to said first output terminal and a second lead of said doped silicon junction device is electrically connected to said second output terminal, wherein said doped silicon junction device is electrically coupled to said first output terminal at a location between said source of charging power and a first terminal contactor, wherein said first terminal contactor corresponds to said source of charging power, wherein said doped silicon junction device is configured to break down and conduct current at a predetermined threshold voltage and create a short between said first and second output terminals if a charging voltage corresponding to said charging power exceeds said predetermined threshold voltage, and wherein said doped silicon junction device has a sufficiently large $I^2t$ to cause a fuse corresponding to the battery pack to blow and interrupt a current path between said battery pack and said source of charging power.

9. The system of claim 8, wherein said doped silicon junction device is electrically coupled to said second output terminal at a location between said source of charging power and a second terminal contactor, wherein said second terminal contactor corresponds to said source of charging power.

10. A system that provides overcharge protection for a battery pack during a battery pack charging cycle, wherein during said battery pack charging cycle a source of charging power is coupled to the battery pack and provides charging power to the battery pack, the system comprising a doped silicon junction device electrically connected between a first output terminal and a second output terminal of the battery pack, said battery pack comprised of a plurality of individual batteries, wherein a first lead of said doped silicon junction device is electrically connected to said first output terminal and a second lead of said doped silicon junction device is electrically connected to said second output terminal, wherein said doped silicon junction device is electrically coupled to said first output terminal at a location between a first terminal contactor and said first output terminal, wherein said first terminal contactor corresponds to said source of charging power, wherein said doped silicon junction device is configured to break down and conduct current at a predetermined threshold voltage and create a short between said first and second output terminals if a charging voltage corresponding to said charging power exceeds said predetermined threshold voltage, and wherein said doped silicon junction device has a sufficiently large $I^2t$ to cause a fuse corresponding to the battery pack to blow and interrupt a current path between said battery pack and said source of charging power.

11. The system of claim 10, wherein said doped silicon junction device is electrically coupled to said second output terminal at a location between a second terminal contactor and said second output terminal, wherein said second terminal contactor corresponds to said source of charging power.

12. The system of claim 8, further comprised of an RC circuit electrically interposed between said doped silicon junction device and said first output terminal.

13. The system of claim 8, wherein said doped silicon junction device does not include a processor and does not include a secondary source of power separate from the battery pack.

14. The system of claim 8, wherein said doped silicon junction device is comprised of an insulated gate bipolar transistor (IGBT).

15. The system of claim 14, further comprising a heat sink in thermal contact with said IGBT.

16. The system of claim 8, wherein said doped silicon junction device is comprised of a crowbar circuit.

17. The system of claim 16, wherein said crowbar circuit is comprised of at least a zener diode and a silicon controlled rectifier.

18. The method of claim 1, further comprising the step of connecting a low pass RC circuit in series with said doped silicon junction device.

19. The method of claim 3, further comprising the steps of selecting an insulated gate bipolar transistor (IGBT) for said doped silicon junction device, wherein said IGBT passes current and shorts said battery pack when said voltage exceeds said predetermined threshold voltage.

20. The method of claim 19, further comprising the step of thermally coupling said IGBT to a heat sink to increase the $I^2t$ value of the IGBT.

21. The method of claim 3, further comprising the step of selecting a crowbar circuit with a trip voltage corresponding to said predetermined threshold voltage for said doped silicon junction device, wherein said crowbar circuit passes current and shorts said battery pack when said voltage exceeds said trip voltage.

22. The method of claim 3, further comprising the step of connecting a low pass RC circuit in series with said doped silicon junction device.

23. The system of claim 10, further comprised of an RC circuit electrically interposed between said doped silicon junction device and said first output terminal.

24. The system of claim 10, wherein said doped silicon junction device does not include a processor and does not include a secondary source of power separate from the battery pack.

25. The system of claim 10, wherein said doped silicon junction device is comprised of an insulated gate bipolar transistor (IGBT).

26. The system of claim 25, further comprising a heat sink in thermal contact with said IGBT.

27. The system of claim 10, wherein said doped silicon junction device is comprised of a crowbar circuit.

28. The system of claim 27, wherein said crowbar circuit is comprised of at least a zener diode and a silicon controlled rectifier.

* * * * *